Feb. 7, 1967     E. B. JOHNSON     3,303,512
APPARATUS FOR RECORDING AIRCRAFT CONDITIONS
Filed Dec. 1, 1964     2 Sheets-Sheet 1
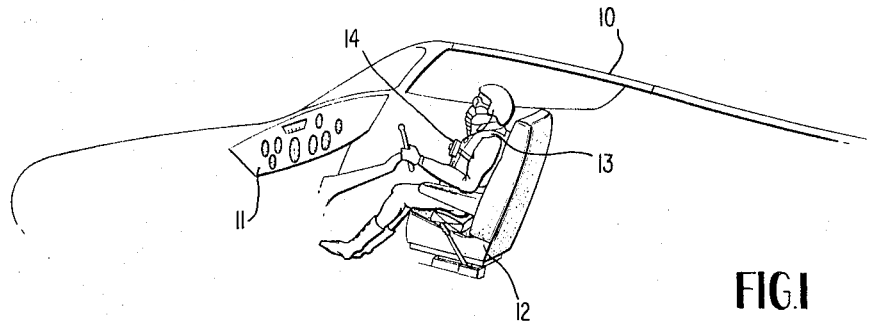
FIG.1
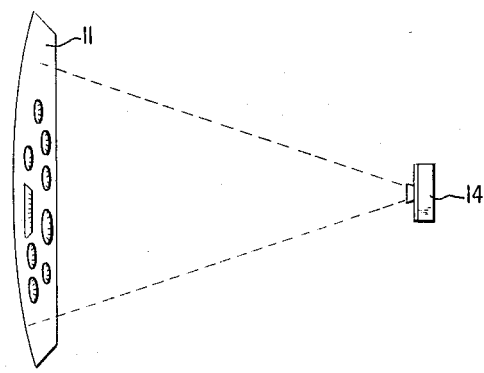
FIG.2
FIG.3
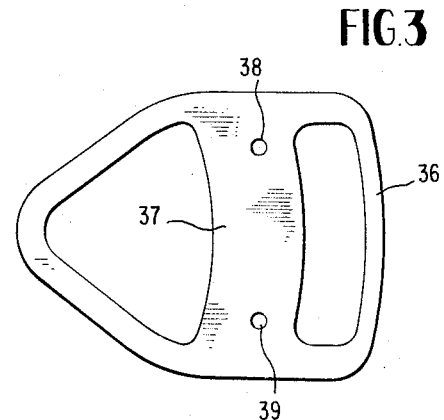
FIG.6
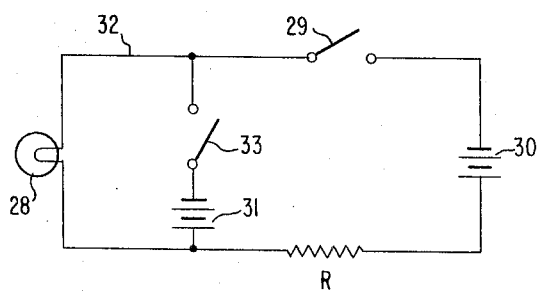
INVENTOR
EDWARD B. JOHNSON
BY *Robert B. Harmon*
ATTORNEY Feb. 7, 1967　　　　　　　E. B. JOHNSON　　　　　　　3,303,512
APPARATUS FOR RECORDING AIRCRAFT CONDITIONS
Filed Dec. 1, 1964　　　　　　　　　　　　　　　　2 Sheets-Sheet 2
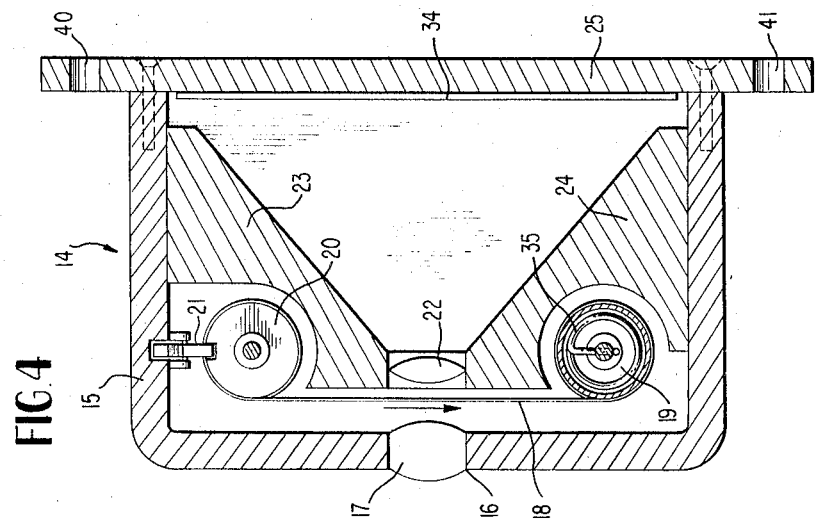
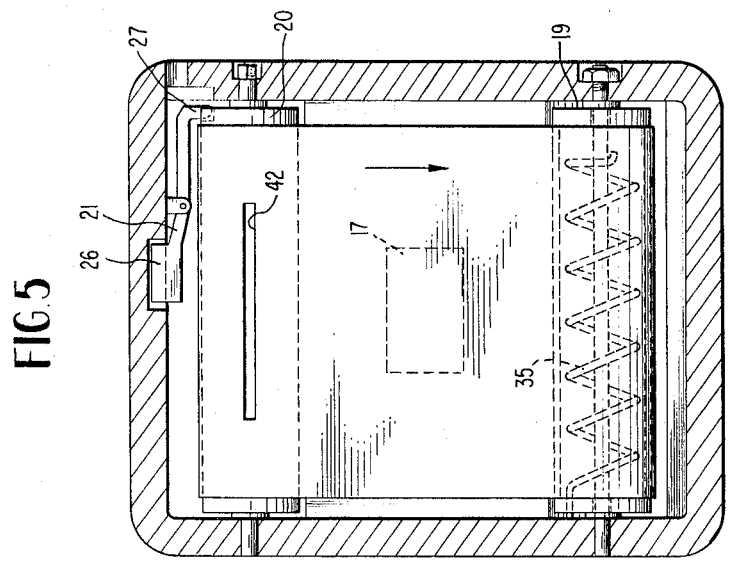
INVENTOR
EDWARD B. JOHNSON
BY *Robert B. Harmon*
ATTORNEY United States Patent Office 3,303,512
Patented Feb. 7, 1967

3,303,512
APPARATUS FOR RECORDING
AIRCRAFT CONDITIONS
Edward B. Johnson, 4654 N. 34th St.,
Arlington, Va. 22207
Filed Dec. 1, 1964, Ser. No. 415,078
7 Claims. (Cl. 346—107)

This invention relates to recording of the conditions of an aircraft at the time of ejection by the pilot or pilots under emergency conditions.

For purposes of air safety, air craft construction and determination of pilot proficiency it is very desirable to have an accurate record of engine instrument readings as well as air speed, altitude, attitude, etc., as they existed during an emergency wherein the pilot has felt obliged to immediately bail-out via the means of an ejection seat assembly provided in military jet aircraft.

It is further desirable to be able to make such a record by automatically photographing the instrument panel at the time of ejection without requiring any special manipulations by the pilot. Further it is desirable that any recording apparatus be small and extremely light in weight.

It is therefore a primary object of this invention to provide a method of automatically photographically recording the conditions of aircraft during an emergency bail-out situation, wherein camera operation is responsive to vertical acceleration forces created during a seat assembly ejection to photograph the instruments of the instrument panel.

Another object of this invention is to provide a method of automatically photographing the instrument panel of an aircraft in which instrument illumination is automatically increased to afford better photographic definition in a recording produced by an acceleration responsive camera during seat assembly ejection.

A further object of this invention is to provide a photographic recording system for automatically recording the indications of instruments in the panel of an aircraft including illumination means for the instruments and an acceleration responsive camera mounted conveniently on the flight gear of the pilot with the illumination means being responsive to seat ejection operations to increase the light on the face of each instrument and with the camera being responsive to the sudden vertical acceleration of the seat assembly to function and record the instrument data on the relatively more heavily illuminated panel.

With the foregoing and other objects in view, the invention resides in the following specification and claims, certain embodiments being illustrated in the accompanying drawings in which:

FIGURE 1 is a fragmentary view of an aircraft cockpit depicting the relative position of the camera and instrument panel forming a part of the system;

FIGURE 2 is a diagrammatic view of the camera affixed to a portion of the pilot's flight gear and focusing on the aircraft instrument panel;

FIGURE 3 is a plan view of a harness buckle to which the camera of the invention may be attached;

FIGURE 4 is a sectional view in side elevation of the camera of this invention;

FIGURE 5 is a front view of the camera of FIGURE 4, and

FIGURE 6 is a schematic diagram of an electrical system typifying the means for illuminating the instrument panel.

Referring more particularly to the drawings, FIGURE 1 illustrates in fragmentary form the cockpit of an aircraft 10 having an instrument panel 11 and an ejection seat assembly 12 for supporting a pilot 13 and a miniature camera 14 secured to the flight gear of the pilot and facing the panel 11. The seat assembly is provided with conventional ejection means and controls therefor (not shown) whereby the pilot may be instantly ejected upwardly with the seat assembly 12 with considerable resulting vertical acceleration.

The camera 14 should be as small as possible commensurate with obtaining a meaningful record. Thus, referring to FIGURE 4 the camera 14 includes a casing 15, and an aperture 16 covered by a suitable filter 17. Within the casing 15 is a traveling shutter 18 which is biased to move downwardly as illustrated by the arrow in FIGURE 4 and to be wound onto spring loaded reel 19. The carrier reel 20 for shutter 18 is provided with a peripheral notch which is engaged by a detent 21 to prevent movement of the reel 20 and hence the shutter. Positioned rearwardly of the shutter is a lens assembly 22 carried by supporting members 23 and 24. The rear of the camera 14 is closed by cover 25 which carries a suitable sensitized film plate 34 upon which a record may be made.

The detent 21 comprises a freely pivoted member having a weighted end portion 26 at the opposite terminus thereof from the reel notch engaging portion 27.

While the camera may be conveniently mounted on various elements of the pilot's flight gear, one of the most suitable pieces of hardware is a buckle 36 usually found with conventional parachute harness. The buckle as shown in FIGURE 3 includes a bridging portion 37 with spaced holes 38 and 39 which receive suitable screws to mate with holes 40 and 41 on the camera rear cover 25. With the buckle 36 normally lying flush against the chest of a pilot then the camera will be focused on the instrument panel as is illustrated in FIGURE 2. However, it is realized that the camera could be mounted in other positions, such as in the helmet and still render both the system and method of the invention fully operable.

In operation the portion 27 of detent 21 is frictionally held in the reel notch by action of spring 35 in reel 19 tensioning shutter 18 to prevent camera operation. Upon seat assembly ejection however, the weighted portion 26 of the detent 21 will move downwardly under predetermined acceleration conditions to trip the shutter free. Shutter 18, which is provided with an aperture 42, will move instantly from reel 20 toward reel 19 with aperture 42 passing the opening 16 in the camera case to expose film plate 34 and thereby take a picture of the instrument panel before the seat assembly actually is ejected from the cockpit. In other words, the camera is designed to operate during the initial stages of the ejection upon the creation of vertical thrust. The term vertical as used here is intended only to refer to the exit path for the ejected seat assembly 12 regardless of aircraft attitude.

It is further desirable but not essential that the instrument lighting be improved whereby the picture taken by camera 14 will be more definitive. By definitive, it should be understood that it is not essential that each instrument be "readable" but merely that the relative positions of the needles be visible. Thus in a particular aircraft having a particular air speed indicator in a usual position, one reading a photo of the same need not be able to read the numbers on the dial to know the air speed at time of seat ejection. This is readily determinable by the position of the needle across the dial of the instrument.

In FIGURE 6 is illustrated schematically a D.C. circuit for illuminating one instrument light bulb 28. Switch 29 may be the usual light switch and battery supply 30 an aircraft power source. Connected in parallel with lamp 28 is a second power source 31 which is of higher voltage than source 30. The concept is to supply lamp 28 with a voltage in excess of its rated capacity during pilot ejection whereby, for a brief period of time, excess illumination to that normally desired will fall across at least certain of the instrument dials. The source 31 is cut into the lamp circuit 32 by means of a switch 33 which may be the seat ejection control switch or which may be otherwise connected therewith by suitable means so as to be coincidentally operable with the ejection control.

In operation, when a pilot feels that ejection from the aircraft is necessary, he need only operate his ejection control switch such as 33 whereby the seat assembly 12 will be propelled out of the aricraft 10 with considerable acceleration in a manner well known to those skilled in the art. As the ejection commences the illumination of the instruments is increased due to the increased lamp voltage. Almost instantly thereafter the acceleration forces acting on the weighted end 26 of detent 21 will release the shutter 18 to expose the film 34 and record the conditions of all instruments on the panel at the moment. It is contemplated that the camera 14 be a rugged, sealed unit so that even if the pilot should not survive the ejection or should be recovered in the water the film 34 may provide a record of conditions which led to the emergency in the first place.

The invention may be embodied in other specific forms without departing from the spirit or essential characteristics thereof. The present embodiment is therefore to be considered in all respects as illustrative and not restrictive, the scope of the invention being indicated by the appended claims rather than the foregoing description, and all changes which come within the meaning and range of equivalency of the claims are therefore to be embraced therein.

What is claimed and desired to be secured by Letters Patent in the United States is:

1. An apparatus for photographically recording the instrument panel of an aircraft during emergency ejection of a pilot from the pilot seat of the ejection type provided with an ejection mechanism and control means therefor, comprising an acceleration-responsive photographic recorder means having normally inoperative shutter release means operated only by acceleration forces of the magnitude occurring during ejection, means for mounting the camera on the flight gear of the pilot in a predetermined position so as to face the instrument panel with the pilot in the normally prescribed position during ejection, and means for automatically recording the instrument panel in the acceleration-responsive recorder means by actuating the ejection control means thereby causing the shutter release means to be operated by said forces to automatically record the instrument panel.

2. An apparatus according to claim 1, further comprising a lighting system for the instrument panel, and connecting means operatively connecting said ejection control means with said lighting system to produce the desired lighting effect during the photographic recording operation.

3. An apparatus according to claim 2, wherein said lighting system includes an electric power source, an auxiliary power source, and switch means for said auxiliary power source and operatively connected by way of said connecting means with the ejection control means to temporarily increase the illumination of the instrument panel during the photographic recording operation.

4. An apparatus according to claim 3, wherein said photographic recorder means includes a normally closed shutter which is actuated by said shutter release means to make the photographic recordation, said shutter release means including latch means operated only by forces corresponding to the acceleration forces during ejection.

5. An apparatus according to claim 4, wherein the securing means detachably secures the recording means to the pilot gear in a single, predetermined place.

6. An apparatus according to claim 1, wherein said photographic recorder means includes a normally closed shutter which is actuated by said shutter release means to make the photographic recordation, said shutter release means including latch means operated only by forces corresponding to the acceleration forces during ejection.

7. An apparatus according to claim 1, wherein the securing means detachably secures the recording means to the pilot gear in a single, predetermined place.

References Cited by the Examiner

UNITED STATES PATENTS

| | | | |
|---|---|---|---|
| 510,759 | 12/1893 | Adams | 95—86 |
| 1,939,665 | 12/1933 | Crew | 95—86 X |
| 2,336,081 | 12/1943 | Finnegan et al. | |
| 2,378,182 | 12/1945 | Burrell | 346—107 X |
| 2,771,826 | 11/1956 | Shapiro | 95—86 |

RICHARD B. WILKINSON, *Primary Examiner.*

J. W. HARTARY, *Assistant Examiner.*